US011623722B2

(12) United States Patent
Liu et al.

(10) Patent No.: US 11,623,722 B2
(45) Date of Patent: Apr. 11, 2023

(54) AERODYNAMIC AQUATIC WEED REMOVAL AND DECONTAMINATION DEVICE AND DECONTAMINATION METHOD

(71) Applicant: Zhejiang University, Hangzhou (CN)

(72) Inventors: Yufei Liu, Hangzhou (CN); Yong He, Hangzhou (CN); Fei Liu, Hangzhou (CN); Yidan Bao, Hangzhou (CN); Hui Fang, Hangzhou (CN); Xiaoli Li, Hangzhou (CN); Haiyan Cen, Hangzhou (CN); Yue Yu, Hangzhou (CN); Hangjian Chu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 320 days.

(21) Appl. No.: 16/920,471

(22) Filed: Jul. 3, 2020

(65) Prior Publication Data

US 2021/0094666 A1  Apr. 1, 2021

(30) Foreign Application Priority Data

Sep. 29, 2019  (CN) .......................... 201910935612.2

(51) Int. Cl.
*B63H 25/42* (2006.01)
*B63H 21/21* (2006.01)
*G01C 21/20* (2006.01)
*G05D 1/02* (2020.01)
*B63H 7/02* (2006.01)
(Continued)

(52) U.S. Cl.
CPC ............. *B63H 25/42* (2013.01); *B63H 21/21* (2013.01); *G01C 21/203* (2013.01); *G05D 1/0206* (2013.01)

(58) Field of Classification Search
None
See application file for complete search history.

(56) References Cited

U.S. PATENT DOCUMENTS 10,037,701 B2 * 7/2018 Harnett .................. B63B 43/18
2015/0277442 A1 * 10/2015 Ballou ................. G05D 1/0027
701/2

FOREIGN PATENT DOCUMENTS

CN  108082403 A  *  5/2018
CN  108082403 A      5/2018

* cited by examiner

*Primary Examiner* — Ig T An
*Assistant Examiner* — Mahmoud M Kazimi
(74) *Attorney, Agent, or Firm* — Avek IP, LLC

(57) ABSTRACT

Aerodynamic aquatic weed removal and decontamination devices and decontamination methods are disclosed. In an embodiment, the aerodynamic aquatic weed removal and decontamination device includes a boat body and a shore-based device for remotely controlling the boat body. The boat body includes a power unit, a weed removal and decontamination unit, a positioning system, an environment perception system, and a shipborne controller. The power unit includes an engine, a propeller connected to the engine, and a rudder servo motor configured to control a heading of the boat body. The weed removal and decontamination unit includes a mesh conveyor. The positioning system includes a positioner configured to obtain real-time location information and heading information of the boat body. The environment perception system includes a wind sensor and a visual sensor. The shipborne controller is configured to control a navigation state of the boat body.

8 Claims, 6 Drawing Sheets

(51) Int. Cl.
*B63B 35/32* (2006.01)
*B63B 35/00* (2020.01)

AERODYNAMIC AQUATIC WEED REMOVAL AND DECONTAMINATION DEVICE AND DECONTAMINATION METHOD

CROSS REFERENCE TO RELATED APPLICATIONS

This application claims priority to Chinese application number 201910935612.2 filed on Sep. 29, 2019, the disclosure of which is incorporated by reference herein in its entirety.

FIELD OF THE DISCLOSURE

The disclosure relates generally to agricultural airboat technologies. More specifically, the disclosure relates to an aerodynamic device for aquatic weed removal and decontamination and a decontamination method.

BACKGROUND

Existing large manned aquatic weed removal and decontamination boats are usually controlled by the crew and driven by the underwater propeller. This is mainly used for weed removal and decontamination work for large and deep water areas such as oceans, lakes, and rivers.

A river cleaning boat facilitating aquatic weed removal was disclosed in the Chinese Patent Publication CN108082403A, and it includes a boat body, slide rails, a bracket, a sludge tank, a collection tank, and a cutter. The slide rails are fixed on the tail of the boat body. The bracket is disposed between the slide rails. A conveyor is mounted on a bevel edge of the bracket. Several fixed plates are distributed on a surface of the conveyor. A curved plate is fixedly connected to the fixed plate. Forward-reverse motors are fixedly connected to two sides of the boat body. A drive end of a forward-reverse motor is fixedly connected to a gear. A boat head of the boat body articulates with a guide plate. A right end of the guide plate is fixedly connected to a decontamination plate. A bottom part of the boat body is fixedly connected to a weed removal motor. The curved plate is configured to sweep sludge on the base of a river channel, and convey the sludge to the sludge tank for storage. An underwater depth of a left end of the conveyor may be adjusted based on a water depth, so that the curved plate is always in contact with the sludge under the water, thereby improving the dredging efficiency. A decontamination plate and a salvage nail are configured to hook aquatic wastes and place the wastes into the collection tank, and the cutter is configured to cut aquatic weeds in the water.

In the prior art, aquatic weed removal and decontamination is implemented by adding a weed removal and decontamination mechanism to a conventional manned boat, and the weed removal and decontamination process depends on movement of the boat. However, the common boat mostly depends on the underwater propeller for power and has a deep draft. On one hand, the cleaning boat equipped with the weed removal mechanism is easily affected by plants, floatage, and so on in the shallow water area, and even an underwater propeller may be destroyed in a severe environment. On the other hand, in some landscape river channels or ponds, high-speed rotation of the underwater propeller may cause great damage to underwater aquatic plant. Because the large manned weed removal and decontamination boat has a large turning radius and a deep draft in the water, the large manned weed removal and decontamination boat cannot be used in narrow and shallow water areas such as the pond in the courtyard, the aquatic vegetable field, and the shallow wetland. As a result, an application scenario of the existing large manned aquatic weed removal and decontamination boat is very limited. In addition, the aquatic weed removal and decontamination work has high labor intensity and long working time, and imposes a relatively high operating requirement for the crew on the boat.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides an aerodynamic aquatic weed removal and decontamination device, including a boat body and a shore-based device for remotely controlling the boat body. the boat body includes a power unit, a weed removal and decontamination unit, a positioning system, an environment perception system, and a shipborne controller. The power unit includes an engine, a propeller connected to the engine, and a rudder servo motor configured to control a heading of the boat body. The weed removal and decontamination unit includes a mesh conveyor. The positioning system including a positioner configured to obtain real-time location information and heading information of the boat body. The environment perception system includes a wind sensor configured to obtain a wind direction in which the boat body is located and a visual sensor configured to detect a dynamic obstacle in front of the boat body. The shipborne controller is configured to control a navigation state of the boat body. The weed removal and decontamination unit is disposed at a front end of the boat body, one end of the mesh conveyor tilts down into water, and the other end of the mesh conveyor is provided with a mesh collection bag.

Optionally, the mesh conveyor is mounted at the front end of the boat body by a bracket, the bracket includes a portal frame and at least one support column, a driving rotating shaft for driving the mesh conveyor to run is disposed on top of the portal frame, a driven rotating shaft is disposed on the other end of the mesh conveyor, and the at least one support column is obliquely fixed between the boat body and the mesh conveyor.

Optionally, the at least one support column includes two support columns, and each one of the two support columns is disposed on each end of the mesh conveyor.

Optionally, the mesh collection bag is disposed below the portal frame.

Optionally, the shore-based device includes a wireless emergency brake and a remote controller. The wireless emergency brake is configured to cooperate with a wireless emergency brake receiver disposed on the boat body and to shut down the engine. The remote controller is configured to cooperate with a remote-control receiver disposed on the boat body and to achieve manual remote-control of the boat body.

Optionally, a magnetic sensor configured to detect a rotation speed of the engine is mounted on the engine.

In other embodiments, the disclosure provides a weed removal and decontamination method implemented by an aerodynamic aquatic weed removal and decontamination device. The method includes the following steps. (1) Initializing all electronic devices and ensuring that all the electronic devices run normally. (2) Generating a weed removal and decontamination path based on an actual status of a target water area, and pre-storing the weed removal and decontamination path into a shipborne controller. (3) Starting and following a $P_i^{th}$ path, wherein i=1 during initialization. (4) Obtaining location information in real time by a shipborne positioning system. (5) Determining whether a current path and a target path intersect at a distance d ahead. (6) Controlling a rudder servo motor to turn at a maximum angle so that a boat body returns to the target path if the current path and the target path do not intersect, and calculating the rudder servo motor angle of the boat body and performing navigation control if the current path and the target path intersect. (7) Detecting a dynamic obstacle based on an image and point cloud information transmitted by a visual sensor in real time, calculating distance information when detecting a moving obstacle in front, and performing braking control until the obstacle moves away from an area within a danger distance if a distance to the obstacle is less than a safety distance. (8) Determining whether to end navigation of the current path based on a real-time location of the boat body and an endpoint location of a tail end of a path. (8.1) If the navigation is not ended, continuing to navigate the current path through (2) to (7), and performing weed removal and decontamination. (8.2) If the navigation is ended, turning to a next path, navigating, performing weed removal and decontamination, and adding 1 to $P_i$. (9) Determining whether all working paths are completed based on a number of paths. (9.1) If the working paths are not completed, continuing the weed removal and decontamination through (2) to (8). (9.2) If the working paths are completed, ending weed removal and decontamination.

Optionally, the current path and the target path intersect when a distance between a location of a boat $(x_{boat}, y_{boat})$ and the target path (y=ax+b) is less than d. The current path and the target path do not intersect when the distance between the location of the boat $(x_{boat}, y_{boat})$ and the target path (y=ax+b) is greater than d. A location of an intersection point $(x_{los}, y_{los})$ is calculated by the following equations.

$$\begin{cases} x_{los} = \dfrac{-B_{los} \pm \sqrt{B_{los}^2 - 4A_{los}C_{los}}}{2A_{los}} \\ y_{los} = a\dfrac{-B_{los} \pm \sqrt{B_{los}^2 - 4A_{los}C_{los}}}{2A_{los}} + b \end{cases}$$

In the above equations, $A_{los}=(a^2+1)$, $B_{los}=2a(b-y_0-2x_0)$, $C_{los}=(b-y_0)^2+x_0^2-d^2$, $(x_0, y_0)$ is a real-time location obtained by the positioning system, a is a slope of the target path, and b is an intercept of the target path.

Optionally, a target heading angle $\varphi_d$ of the boat is calculated by the following equations.

$$\varphi_d = \begin{cases} \arctan\left(\dfrac{x_{los}-x_0}{y_{los}-y_0}\right), & \text{when } x_{los} \geq x_0, y_{los} \geq y_0 \\ \arctan\left(\dfrac{y_0-y_{los}}{x_{los}-x_0}\right)+90°, & \text{when } x_{los} > x_0, y_{los} \leq y_0 \\ \arctan\left(\dfrac{x_0-x_{los}}{y_0-y_{los}}\right)+180°, & \text{when } x_{los} \leq x_0, y_{los} < y_0 \\ \arctan\left(\dfrac{y_{los}-y_0}{x_0-x_{los}}\right)+270°, & \text{when } x_{los} < x_0, y_{los} \geq y_0 \end{cases}$$

A heading deviation is calculated based on a real-time heading of the boat by the following equation.

$$\Delta\varphi=\varphi_d-\varphi$$

In the above equation, $\varphi$ is the real-time heading angle obtained by the positioning system, an amount of interference caused by a wind to a steering angle $F_{wind}$ is calculated by the following equation.

$$F_{wind}=(kV_w \sin \theta_w)^2$$

$\theta_w$ is an included angle between the wind direction and current heading, $V_w$ is a wind speed, k is an impact weighting value of wind and is obtained by testing under an actual environment, and a steering angle of navigation control is calculated by the following equation.

$$\delta_t=k_p\Delta\varphi_t+(\Delta\varphi_t-\Delta\varphi_{t-1})F_{wind}$$

In the above equation, $k_p$ is a control scale factor, $k_d$ is a control differential factor, $\delta_t$ is an output steering angle, $\Delta\varphi_t$ and $\Delta\varphi_{t-1}$ are respective heading deviations at a moment t and a moment t−1, and $F_{wind}$ is the amount of interference caused by the wind to the steering angle.

BRIEF DESCRIPTION OF THE DRAWINGS

Illustrative embodiments of the present disclosure are described in detail below with reference to the figures.

DETAILED DESCRIPTION

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Referring to FIG. 1 to FIG. 6, an aerodynamic aquatic weed removal and decontamination device in an example may include a boat body 4 and a shore-based device for remotely controlling the boat body 4. The boat body 4 may be provided with a power unit, a weed removal and decontamination unit, a positioning system, an environment perception system, and a shipborne controller.

Figure 1:
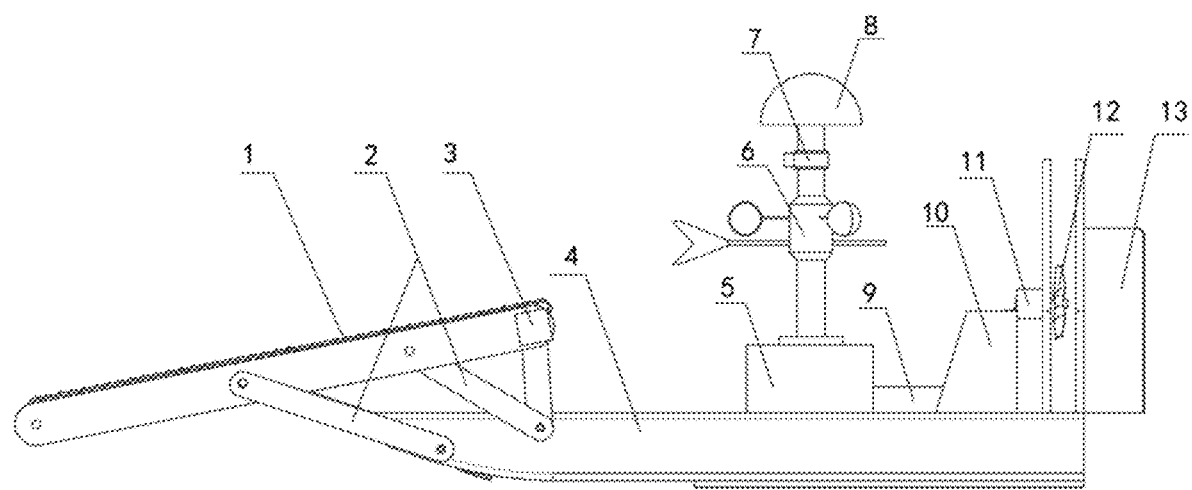
FIG. 1 is a schematic structural diagram of an aerodynamic aquatic weed removal and decontamination device according to an embodiment of the disclosure.
Figure 2:
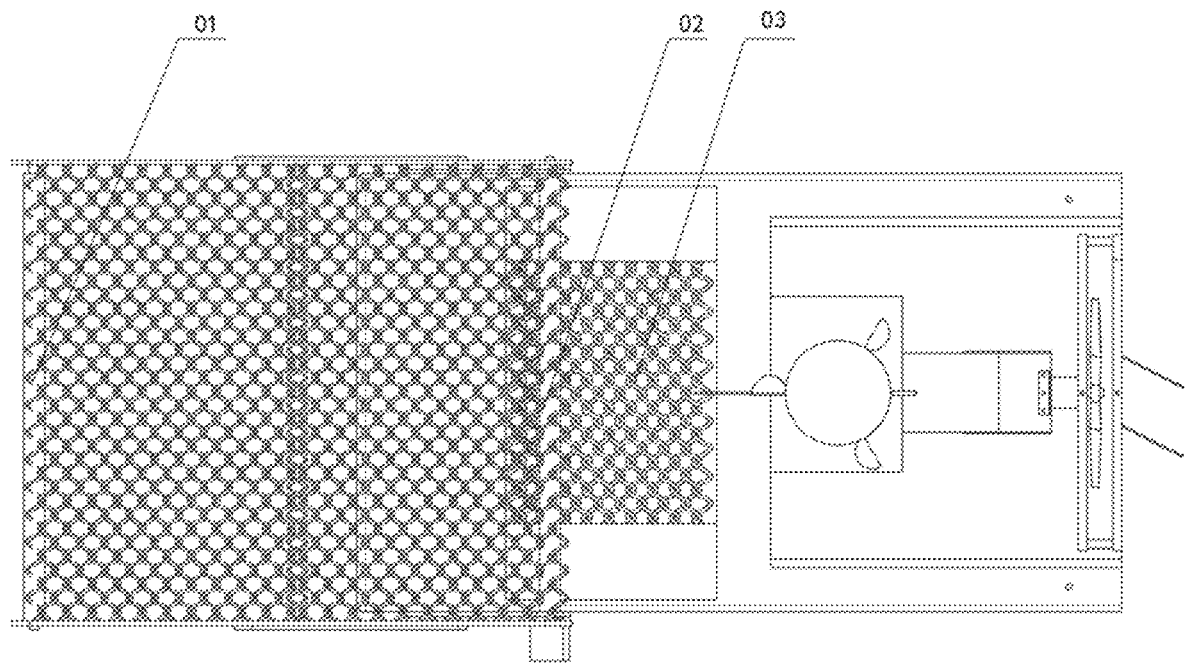
FIG. 2 is a schematic structural diagram of a weed removal and decontamination unit according to an embodiment of the disclosure.
Figure 3:
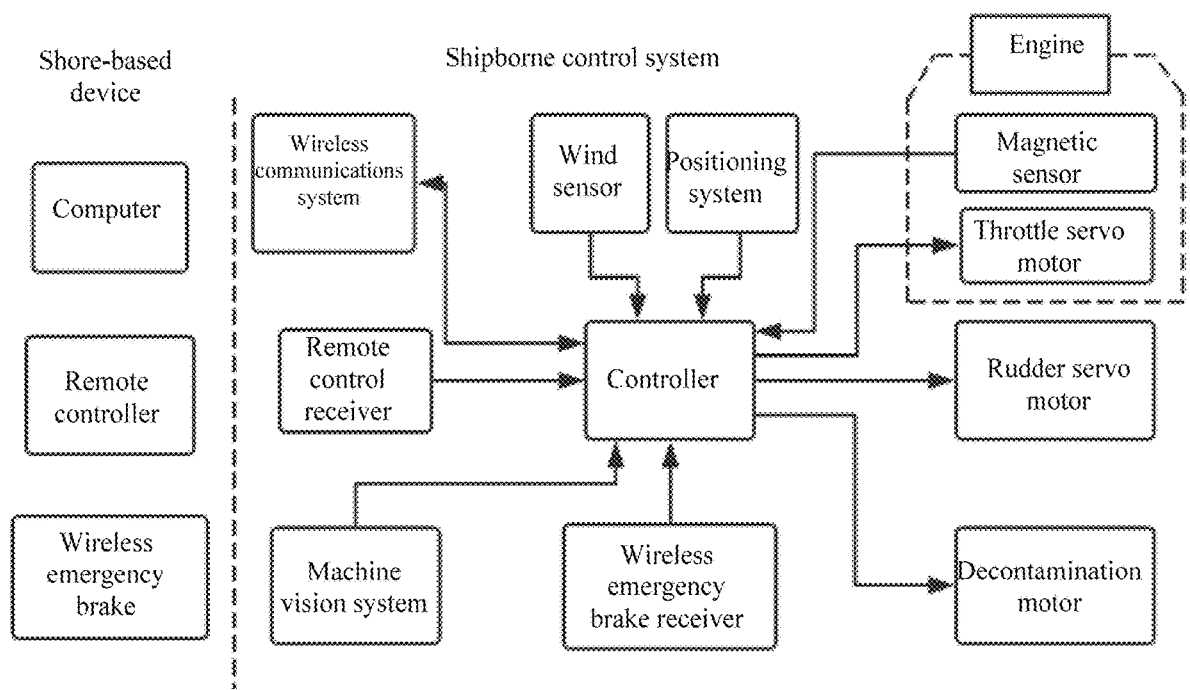
FIG. 3 is a schematic diagram of an automatic navigation safety assistance system of an aerodynamic aquatic weed removal and decontamination device according to an embodiment of the disclosure.

As shown in FIG. 1, the power unit may provide power output by an engine 11 mounted on an engine rack 10 at a rear part of the boat body 4, and may drive an aerodynamic propeller 12 to rotate to generate driving force and a rudder servo motor 13 to control heading of the boat. The weed removal and decontamination unit is shown in FIG. 1 and FIG. 2, and may include a mesh conveyor 1 located in front of the boat body 4, a driving rotating shaft 02, a driven rotating shaft 01, a motor 3, a portal frame, and support columns 2. When the mesh conveyor 1 is driven by the motor 3 to drive the driving rotating shaft 02 to rotate, aquatic weeds and wastes may be rolled onto a surface of the mesh conveyor 1, and may fall into a mesh collection bag 03 of the airboat as the conveyor rotates, to complete aquatic weed removal and decontamination. Extra moisture may be discharged through mesh gaps in a transfer process.

A computing core of a shipborne control system 5 may be the shipborne controller, and the shipborne controller may obtain real-time location information and heading information of the boat body by the positioning system 8 (a dual-antenna GPS receiver). Considering that there are fewer aquatic blockings, and ventilation is fast, because the airboat sits shallow in the water, wind causes higher interference to navigation, thereby improving wind-resistance control. The shipborne controller may obtain current wind speed and wind direction information by a wind sensor 6. A degree of impact caused by wind to navigation may be calculated based on the information, angles of a throttle servo motor of a connected fuel tank 9 and a rudder servo motor steering engine may be finally calculated based on the obtained real-time location and heading information. In a remote-control mode, a shore-based remote controller may cooperate with a shipborne remote-control receiver to manually and/or remotely control the device to conduct weed removal and decontamination work for a target water area.

In an autonomous navigation mode, a preset weed removal and decontamination path may need to be loaded into the shipborne controller to avoid a known aquatic obstacle such as an artificial island, a telegraph pole, a tree, or an earth hummock. For a dynamic obstacle such as a farmer in work or a water bird, the dynamic obstacle may be detected by real-time image and point cloud data obtained by a three-dimensional visual sensor 7. When a moving obstacle is in an area within a planned danger distance, a braking command may be triggered immediately until the moving obstacle moves out of the danger area. The wind sensor 6 and the visual sensor 7 may constitute the environment perception system in this example.

A magnetic sensor may be mounted on the engine 11 to detect a rotation speed of the engine. In addition, a wireless communications system may a 3G/4G module and may be configured to send a real-time state of the boat body including a boat speed, a navigation error, and a task completion state to a shore-based computer so that an operator may perform remote monitoring. In case of emergency, a shore-based wireless emergency brake may cooperate with a shipborne wireless emergency brake receiver to quickly shut down the engine, which may help to avoid an accident such as collision.

Figure 4:
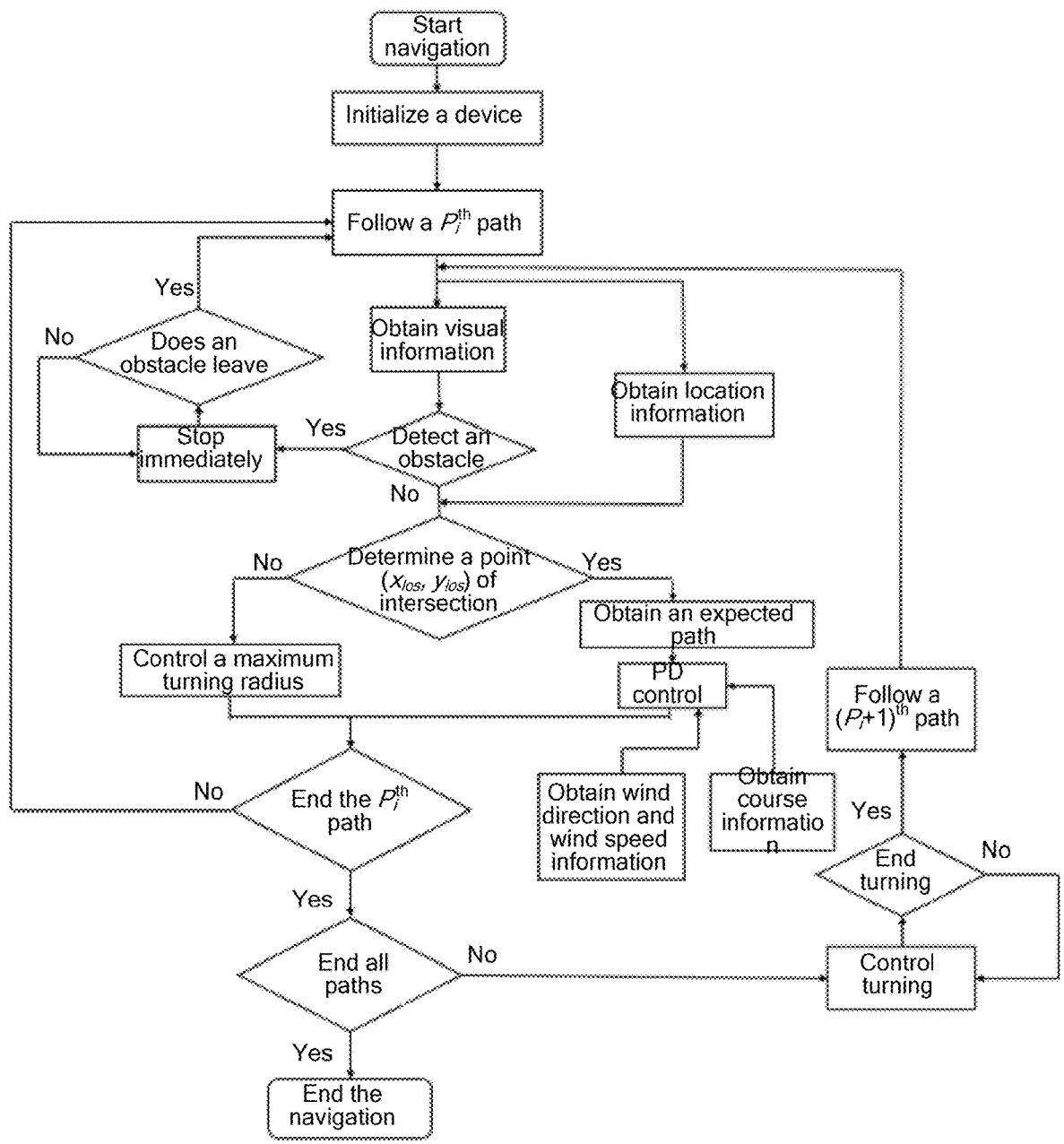
FIG. 4 is a flowchart of a decontamination method implemented by an aerodynamic aquatic weed removal and decontamination device according to an embodiment of the disclosure.
Figure 5:
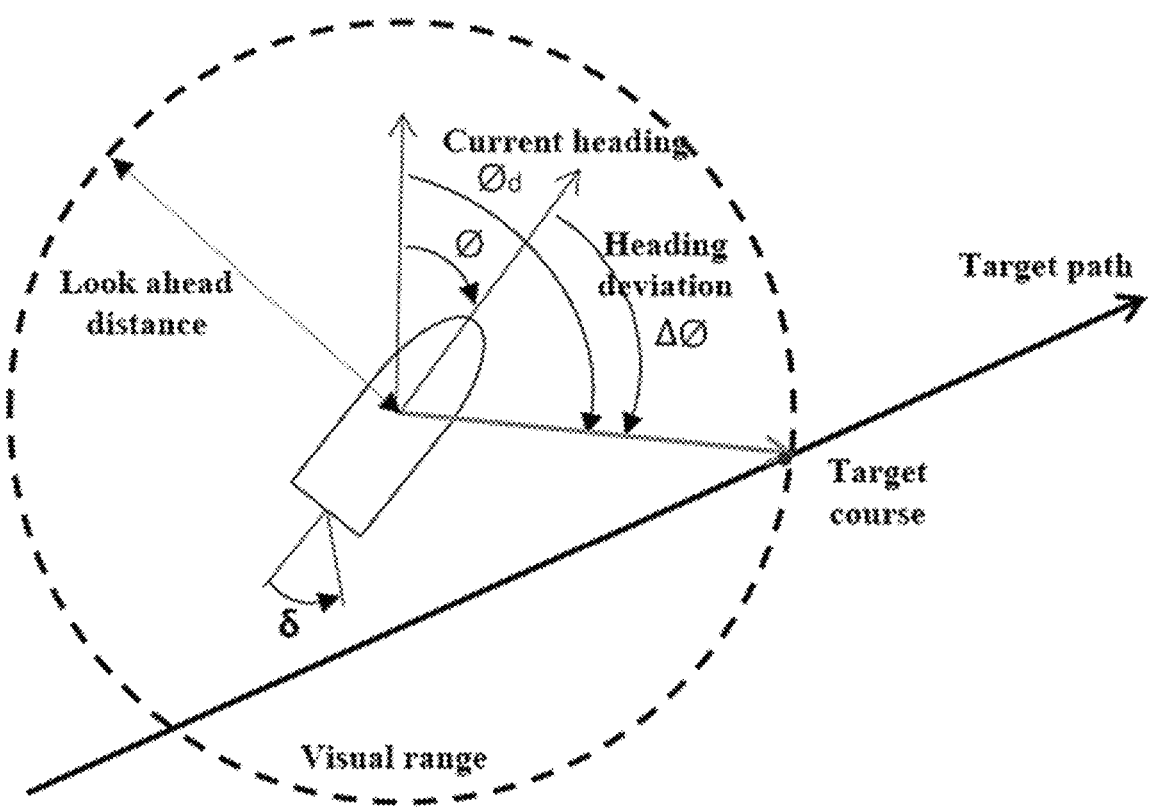
FIG. 5 is a navigation analysis diagram according to an embodiment of the disclosure.

The foregoing describes a technical solution of the weed removal and decontamination work in the autonomous navigation mode according to an embodiment of the disclosure, to explain the technical means more clearly and implement the technical means based on content of this specification, the following describes an implementation method of a weed removal and decontamination process in the autonomous navigation mode according to another embodiment of the disclosure. A flowchart is shown in FIG. 4, and the method may include the following steps.

Step 1. Initializing all electronic devices and ensuring that all the electronic devices run normally.

Step 2. Generating a weed removal and decontamination path based on an actual status of a target water area, and pre-storing the weed removal and decontamination path into a shipborne controller.

Step 3. Starting and following a $P_i^{th}$ path, where during initialization, i=1, that is, the first path is started and followed.

Step 4. Obtaining location information in real time by a shipborne positioning system.

Step 5. Determining whether a current path and a target path intersect at a distance d ahead.

When a distance between a location of a boat ($x_{boat}$, $y_{boat}$) and the target path (y=ax+b) is less than d, the current path and the target path intersect. When the distance is greater than d, the current path and the target path do not intersect.

A location of a point ($x_{los}$, $y_{los}$) of intersection may be calculated by the following equations.

$$\begin{cases} x_{los} = \dfrac{-B_{los} \pm \sqrt{B_{los}^2 - 4A_{los}C_{los}}}{2A_{los}} \\ y_{los} = a\dfrac{-B_{los} \pm \sqrt{B_{los}^2 - 4A_{los}C_{los}}}{2A_{los}} + b \end{cases}$$

In the above equations, $A_{los}=(a^2+1)$, $B_{los}=2a(b-y_0-2x_0)$, $C_{los}=(b-y_0)^2+x_0^2-d^2$, ($x_0$, $y_0$) is real-time location information obtained by a positioning system, a is slope of the target path, and b is an intercept of the target path.

Step 6. If the current path and the target path do not intersect, controlling a rudder servo motor to turn at a maximum angle so that a boat body returns to the target path. If the current path and the target path intersect, calculating a rudder servo motor angle of the boat body and performing navigation control.

A formula for calculating a target heading angle $\varphi_d$ of the boat is as follows.

$$\begin{cases} \arctan\left(\dfrac{x_{los} - x_0}{y_{los} - y_0}\right), & \text{when } x_{los} \geq x_0, y_{los} \geq y_0 \\ \arctan\left(\dfrac{y_0 - y_{los}}{x_{los} - x_0}\right) + 90°, & \text{when } x_{los} > x_0, y_{los} \leq y_0 \\ \arctan\left(\dfrac{x_0 - x_{los}}{y_0 - y_{los}}\right) + 180°, & \text{when } x_{los} \leq x_0, y_{los} < y_0 \\ \arctan\left(\dfrac{y_{los} - y_0}{x_0 - x_{los}}\right) + 270°, & \text{when } x_{los} < x_0, y_{los} \geq y_0 \end{cases}$$

A heading deviation may be calculated based on real-time heading of the boat according to the following equation.

$$\Delta\varphi = \varphi_d - \varphi$$

In the above equation, $\varphi$ is a real-time heading angle information obtained by the positioning system.

An amount of interference caused by wind to a steering angle may be represented as $F_{wind}$, and it may be calculated by the following equation.

$$F_{wind} = (kV_w \sin\theta_w)^2$$

In the above equation, $\theta_w$ is an included angle between a wind direction and current heading, $V_w$ is a wind speed, and k is an impact weighting value of wind and is obtained through testing at actual conditions.

A steering angle of navigation control may be calculated by the following equation.

$$\delta_t = k_p\Delta\varphi_t + k_d(\Delta\varphi_t - \Delta\varphi_{t-1}) - F_{wind}$$

In the above equation, $k_p$ is a control scale factor, $k_d$ is a control differential factor, $\delta_t$ is an output steering angle, $\Delta\varphi_t$ and $\Delta\varphi_{t-1}$ are respectively heading deviations at a moment t and a moment t−1, and $F_{wind}$ is an amount of interference caused by wind to the steering angle.

Step 7. Detecting a dynamic obstacle based on an image and point cloud information that are transmitted by a visual sensor in real time, calculating distance information when it is detected that there is a moving obstacle in front. If a distance to the obstacle is less than a safety distance, perform braking control until the obstacle moves away from an area within a danger distance.

Step 8. Determining, based on a real-time location of the boat body and an endpoint location of a tail end of a path, whether to end navigation of the current path. If the navigation is ended, turn to a next path, navigate, perform weed removal and decontamination, and add 1 to $P_i$. If the navigation is not ended, continue to navigate the current path through step 2 to step 7, and perform weed removal and decontamination.

Step 9. Determining, based on the number of paths, whether all working paths are completed. If the working paths are completed, end working. If the working paths are not completed, continue weed removal and decontamination work through step 2 to step 8.

Figure 6:
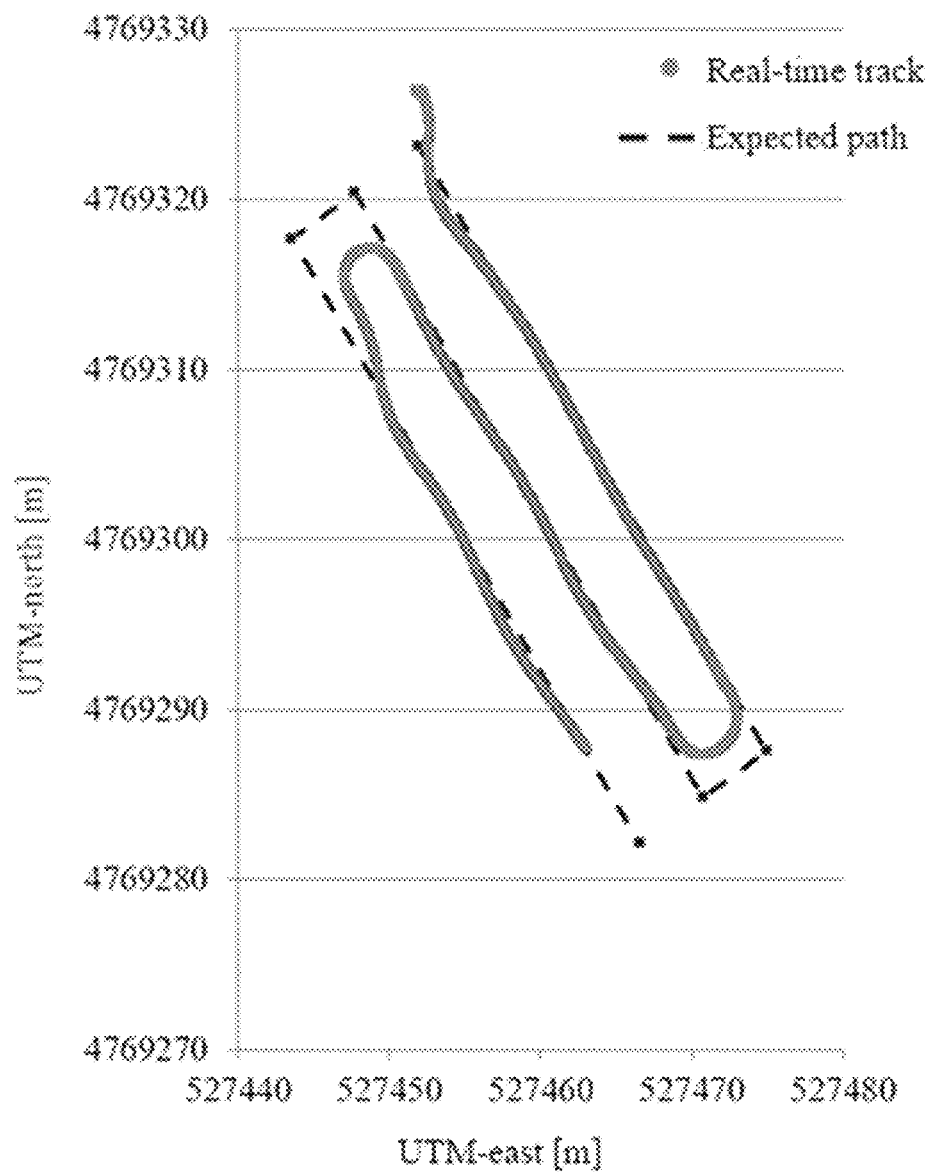
FIG. 6 is a navigation experimental test diagram of an aerodynamic aquatic weed removal and decontamination device according to an embodiment of the disclosure.

FIG. 6 is used as a path diagram for descriptions that three navigation paths are set and a weed removal and decontamination work experiment in an autonomous navigation mode is conducted. The schematic examples of the invention and description thereof are intended to be illustrative of the disclosure and do not constitute an undue limitation of the disclosure.

Various embodiments of the disclosure may have one or more of the following effects.

In some embodiments, disclosure provides an aerodynamic aquatic weed removal and decontamination device and a decontamination method, which may help to solve problems of weed removal and decontamination in narrow and shallow river channels in cities or narrow and shallow water areas having a large quantity of landscape plants such as ponds or artificial lakes.

In other embodiments, the disclosure provides a boat with remote-control and autonomous navigation functions, which may help to implement unmanned operation, reduce labor input, and reduce labor intensity.

In further embodiments, an engine may provide a power output to drive the propeller to rotate to generate driving force. The rudder servo motor may control the heading of the boat. The boat may sit extremely shallow in the water, may be flexible in navigation, may have a small turning radius, and may have a high maneuverability. Therefore, the boat may be used in shallow and narrow water areas having a complicated underwater situation. For example, a pond in a yard, an artificial lake, and a landscape river channel. The mesh conveyor may be driven by a motor to rotate to complete aquatic weed removal and decontamination. In this process, aquatic weeds and wastes may be rolled onto a surface of the mesh conveyor and may fall into the mesh collection bag as the conveyor rotates. Extra moisture may be discharged through mesh gaps in a transfer process.

In some embodiments, disclosed devices and decontamination methods may help to implement efficient and unmanned weed removal and decontamination in narrow and shallow water areas with a complicated aquatic environment.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. An aerodynamic aquatic weed removal and decontamination device, comprising a boat body and a shore-based device for remotely controlling the boat body, wherein the boat body comprises:
   a power unit comprising an engine, a propeller and a rudder server motor, wherein the propeller is connected to the engine and the rudder servo motor is configured to control a heading of the boat body;
   a weed removal and decontamination unit comprising a mesh conveyor, wherein:
      the weed removal and decontamination unit is disposed at a front end of the boat body;
      one end of the mesh conveyor tilts down into water; and
      the other end of the mesh conveyor is provided with a mesh collection bag;
   a positioning system comprising a positioner configured to obtain real-time location information and heading information of the boat body;
   an environment perception system comprising a wind sensor and a visual sensor, wherein the wind sensor is configured to obtain a wind direction in which the boat body is located and the visual sensor is configured to detect a dynamic obstacle in front of the boat body; and
   a shipborne controller configured to control a navigation state of the boat body;
   wherein the aerodynamic aquatic weed removal and decontamination device is configured to implement a weed removal and decontamination method comprising the steps of:
      (1) initializing all electronic devices, and ensuring that all the electronic devices run normally;
      (2) generating a weed removal and decontamination path based on an actual status of a target water area, and pre-storing the weed removal and decontamination path into a shipborne controller;
      (3) starting and following a $P_i^{th}$ path, wherein i=1 during initialization;
      (4) obtaining location information in real time by a shipborne positioning system;
      (5) determining whether a current path and a target path intersect at a distance d ahead;
      (6) controlling a rudder servo motor to turn at a maximum angle so that a boat body returns to the target path if the current path and the target path do not intersect, and calculating the rudder servo motor angle of the boat body and performing navigation control if the current path and the target path intersect;
      (7) detecting a dynamic obstacle based on an image and point cloud information transmitted by a visual sensor in real time, calculating distance information when detecting a moving obstacle in front, and performing braking control until the obstacle moves away from an area within a danger distance if a distance to the obstacle is less than a safety distance;
(8) determining whether to end navigation of the current path based on a real-time location of the boat body and an endpoint location of a tail end of a path,
(8.1) if the navigation is not ended, continuing to navigate the current path through (2) to (7), and performing weed removal and decontamination, and
(8.2) if the navigation is ended, turning to a next path, navigating, performing weed removal and decontamination, and adding 1 to $P_i$; and
(9) determining whether all working paths are completed based on a number of paths,
(9.1) if the working paths are not completed, continuing the weed removal and decontamination through (2) to (8), and
(9.2) if the working paths are completed, ending weed removal and decontamination.

2. The device according to claim 1, wherein:
the mesh conveyor is mounted at the front end of the boat body by a bracket;
the bracket comprises a portal frame and at least one support column;
a driving rotating shaft for driving the mesh conveyor to run is disposed on top of the portal frame;
a driven rotating shaft is disposed on the other end of the mesh conveyor; and
the at least one support column is obliquely fixed between the boat body and the mesh conveyor.

3. The device according to claim 2, wherein:
the at least one support column comprises two support columns; and
each one of the two support columns is disposed on each end of the mesh conveyor.

4. The device according to claim 2, wherein the mesh collection bag is disposed below the portal frame.

5. The device according to claim 1, wherein the shore-based device comprises:
a wireless emergency brake configured to cooperate with a wireless emergency brake receiver disposed on the boat body and to shut down the engine; and
a remote controller configured to cooperate with a remote-control receiver disposed on the boat body and to achieve manual remote-control of the boat body.

6. The device according to claim 1, wherein a magnetic sensor configured to detect a rotation speed of the engine is mounted on the engine.

7. The device according to claim 1, wherein in step (5):
the current path and the target path intersect when a distance between a location of a boat $(x_{boat}, y_{boat})$ and the target path $(y=ax+b)$ is less than d;
the current path and the target path do not intersect when the distance between the location of the boat $(x_{boat}, y_{boat})$ and the target path $(y=ax+b)$ is greater than d; and
a location of an intersection point $(x_{los}, y_{los})$ is calculated by the following equations:

$$\begin{cases} x_{los} = \dfrac{-B_{los} \pm \sqrt{B_{los}^2 - 4A_{los}C_{los}}}{2A_{los}} \\ y_{los} = a\dfrac{-B_{los} \pm \sqrt{B_{los}^2 - 4A_{los}C_{los}}}{2A_{los}} + b \end{cases},$$

wherein:
$A_{los}=(a^2+1)$;
$B_{los}=2a(b-y_0-2x_0)$;
$C_{los}=(b-y_0)^2+x_0^2-d^2$;
$(x_0, y_0)$ is a real-time location obtained by the positioning system;
a is a slope of the target path; and
b is an intercept of the target path.

8. The device according to claim 1, wherein in step (6):
a target heading angle $\varphi_d$ of the boat is calculated by the following equations:

$$\varphi_d = \begin{cases} \arctan\left(\dfrac{x_{los}-x_0}{y_{los}-y_0}\right), & \text{when } x_{los} \geq x_0, y_{los} \geq y_0 \\ \arctan\left(\dfrac{y_0-y_{los}}{x_{los}-x_0}\right)+90°, & \text{when } x_{los} > x_0, y_{los} \leq y_0 \\ \arctan\left(\dfrac{x_0-x_{los}}{y_0-y_{los}}\right)+180°, & \text{when } x_{los} \leq x_0, y_{los} < y_0 \\ \arctan\left(\dfrac{y_{los}-y_0}{x_0-x_{los}}\right)+270°, & \text{when } x_{los} < x_0, y_{los} \geq y_0 \end{cases};$$

a heading deviation is calculated based on a real-time heading of the boat by the following equation:

$\Delta\varphi = \varphi_d - \varphi$, wherein $\varphi$ is the real-time heading angle obtained by the positioning system;
an amount of interference caused by a wind to a steering angle $F_{wind}$ is calculated by the following equation:

$F_{wind}=(kV_w \sin\theta_w)^2$, wherein:
$\theta_w$ is an included angle between the wind direction and current heading;
$V_w$ is a wind speed; and
k is an impact weighting value of wind and is obtained by testing under an actual environment; and a steering angle of navigation control is calculated by the following equation:

$\delta_t = k_p\Delta\varphi_t + k_d(\Delta\varphi_t - \Delta\varphi_{t-1}) - F_{wind}$, wherein:
$k_p$ is a control scale factor;
$k_d$ is a control differential factor;
$\delta_t$ is an output steering angle;
$\Delta\varphi_t$ and $\Delta\varphi_{t-1}$ are respective heading deviations at a moment t and a moment t-1; and
$F_{wind}$ is the amount of interference caused by the wind to the steering angle.

* * * * *